US006832322B1

(12) United States Patent
Boden et al.

(10) Patent No.: US 6,832,322 B1
(45) Date of Patent: Dec. 14, 2004

(54) SYSTEM AND METHOD FOR NETWORK ADDRESS TRANSLATION INTEGRATION WITH IP SECURITY

(75) Inventors: Edward B. Boden, Vestal, NY (US); Tod A. Monroe, Maine, NY (US)

(73) Assignee: International Business Machines Corporation, Armonk, NY (US)

( * ) Notice: Subject to any disclaimer, the term of this patent is extended or adjusted under 35 U.S.C. 154(b) by 985 days.

(21) Appl. No.: 09/595,950

(22) Filed: Jun. 16, 2000

Related U.S. Application Data (63) Continuation-in-part of application No. 09/240,720, filed on Jan. 29, 1999.

(51) Int. Cl.[7] .......................... G06F 11/30; G06F 12/14; H04L 9/100
(52) U.S. Cl. ....................................... 713/201; 713/200
(58) Field of Search .................................. 713/201, 200

(56) References Cited

U.S. PATENT DOCUMENTS

| | | | |
|---|---|---|---|
| 5,550,984 A | 8/1996 | Gelb ...................... | 395/200.17 |
| 5,640,456 A | 6/1997 | Adams, Jr. et al. ........... | 380/49 |
| 5,757,924 A | 5/1998 | Friedman et al. ............. | 380/49 |
| 5,761,201 A | 6/1998 | Vaudreuil .................... | 370/392 |
| 5,793,763 A | 8/1998 | Mayes et al. ................ | 370/389 |
| 5,825,891 A | 10/1998 | Levesque et al. ............. | 380/49 |
| 5,828,893 A | 10/1998 | Wied et al. .................. | 395/800 |
| 5,835,726 A | 11/1998 | Shwed et al. .......... | 395/200.59 |
| 6,182,226 B1 * | 1/2001 | Reid et al. ................... | 713/201 |

OTHER PUBLICATIONS

"Virtual Private Networks on Vendor Independent Networks", *IBM Technical Disclosure Bulletin*, vol. 35, No. 4A Sep. 1992 pp. 326–329.

Information Sciences Institute, University of Southern California, "Internet Protocol DARPA Internet Program Protocol Specification", Request for Comments (RFC) 791, Sep. 1981.

J. Postel, "Internet Control Message Protocol", Network Working Group RFC 792, Sep. 1981.

J. Postel, "File Transfer Protocol (FTP)", Network Working Group RFC 959, Oct. 1985.

S. Kent and R. Atkinson, "Security Architecture for the Internet Protocol", Network Working Group RFC 2401, Nov. 1998.

S. Kent and R. Atkinson, "IP Authentication Header", Network Working Group RFC 1826, Nov. 1998.

S. Kent and R. Atkinson, "IP Encapsulating Security Payload (ESP)", Network Working Group RFC 1827, Nov. 1998.

D. Harkins and D. Carrel, "The Internet Key Exchange (IKE)", Network Working Group RFC 2409, Nov. 1998.

S. Deering and R. Hindin, "Internet Protocol, Version 6 (IPv6) Specification", Network Working Group RFC 2460, Dec. 1998.

P. Srisuresh, *Security Model with Tunnel–mode IPsec for NAT Domains*. Network Working Group, Request for Comments (RFC): 2709, Oct. 1999, 11 pages. [<draft–ietf–nat–security–00.txt>].

* cited by examiner

*Primary Examiner*—Justin T. Darrow
*Assistant Examiner*—Grigory Gurshman
(74) *Attorney, Agent, or Firm*—Shelley M. Beckstrand (57) ABSTRACT

IP security is provided in a virtual private network using network address translation (NAT) by performing one or a combination of the four types of VPN NAT, including VPN NAT type a source-outbound IP NAT, VPN NAT type b destination-outbound, VPN NAT type c inbound-source IP NAT, and VPN NAT type d inbound-destination IP NAT. This involves dynamically generating NAT rules and associating them with the manual or dynamically generated (IKE) Security Associations, before beginning IP security that uses the Security Associations. Then, as IP Sec is performed on outbound and inbound datagrams, the NAT function is also performed.

19 Claims, 7 Drawing Sheets

ADDRESS DOMAINS

I.   NO NAT

II.  REQUIRES DEST OUT NAT ONLY

III. REQUIRES SOURCE OUT NAT ONLY

IV.  REQUIRES BOTH DEST OUT AND SRC OUT NAT

A   ADDRESS OF HOST BEHIND GATEWAY
B   ADDRESS OF EXTERNAL HOST

FIG. 7

SYSTEM AND METHOD FOR NETWORK ADDRESS TRANSLATION INTEGRATION WITH IP SECURITY

CROSS REFERENCES TO RELATED APPLICATIONS

This application is a Continuation-In-Part (CIP) of Ser. No. 09/240,720, filed 29 Jan. 1999, entitled "System and Method for Network Address Translation Integration With IP Security".

BACKGROUND OF THE INVENTION

U.S. patent applications Ser. No. 09/239,693, filed Jan. 29, 1999, entitled System and Method for Managing Security Objects; Ser. No. 09/240,718, filed Jan. 29, 1999, entitled "System and Method for Dynamic Macro Placement of IP Connection Filters"; S/N 09/239,694, filed Jan. 29, 1999, entitled "System and Method for Dynamic Micro Placement of IP Connection Filters"; S/N 09/240,483, filed Jan. 29, 1999, entitled "System and Method for Central Management of Connections in a Virtual Private Network, and S/N 09/578215, filed May 23, 2000, entitled "System and Method for Network Address Translation Integration with IP Security", assignee docket END9 1999 0129 US1 are assigned to the same assignee hereof and contain subject matter related, in certain respects, to the subject matter of the present application. The above-identified patent applications are incorporated herein by reference.

Technical Field of the Invention

This invention pertains to security over virtual private network (VPN) connections. More particularly, it relates to VPN NAT, or concurrent use of network address translation (NAT) and Internet Protocol (IP) Security (IPSec) protocols.

Background Art

Virtual Private Networks (VPNs) are an active area of technical development throughout the Internet and computing industry. This is because they are a fundamental enabler for most forms of e-business. VPNs use protocol tunneling and encryption and decryption technology (IP Security protocols) to allow clients and servers, branch offices, or independent organizations to exploit the Internet for their TCP/IP traffic at much lower costs than buying dedicated lines, without losing a key benefit of dedicated lines: privacy.

The tunneling that VPN employs has a side effect, which creates a problem: two subnets or companies, or other users, which didn't initially communicate directly, now do, and this greatly increases the likelihood of IP address conflicts.

Network Address Translation (NAT) is widely deployed in Internet and in companies connecting to the Internet to overcome address conflicts. These conflicts commonly occur between designated 'private' address spaces (e.g. 10.*.*.*).

However, NAT and IP Security (IP Sec) are architecturally conflicting. In fact, NAT breaks IP Sec. That is, NAT "is the feature which finally breaks the semantic overload of the IP address as both a locator and the end-point identifier" (see, "Architectural Implications of NAT", draft-iab-nat-implications-00, txt, March 1998. IPSec is described in Kent, S., and Atkinson, "Security Architecture for the Internet Protocol", RFC2401, November 1998; Kent, S., and Atkinson, "IP Authentication Protocol", RFC 2402, November 1998; and Kent, S., and Atkinson, "IP Encapsulation Security Payload", RFC 2406, November 1998.) As a result, two hosts cannot establish an IP Sec connection if there is a NAT system in between. There are two reasons why: the IP traffic that flows between the two hosts (for the IP Sec connection) will have authentication protocol (AH) or encapsulation security payload (ESP) applied. (See RFC's 2402 and 2406, supra.)

First, with respect to ESP in tunnel mode, the IP address that needs to be translated is inside the ESP tunnel and is encrypted. It is, therefore, unavailable to NAT. With respect to authentication protocol (AH) in transport or tunnel mode, the IP address that needs to be translated is visible in NAT, but the AH authentication includes it. Therefore, changing the IP address will break the authentication at the remote end of the IP Sec connection. With respect to ESP in transport mode, even if ESP is used with authentication, the IP address is available to NAT. But, if the IP address is changed, the IP Sec connection breaks due to the breaking of authentication at the remote end of the IP Sec connection.

Second, even if the IP traffic for the IP Sec connection could be translated, it would fail because the IP Sec connection is based on Security Associations which contain the two host IP addresses. These are fundamental to the Security Association architecture (see RFC 2401, supra), in that the inbound IP Sec, on the host where decrypting (or authentication) is to occur, must be uniquely determined by the triple:

{destination IP addr, SPI, IP Sec protocol}.

where SPI is the security protocol index (see, RFC 2401, supra).

For example, given hosts A & W, assume NAT is applied to an IP datagram (a generic term for bytes that go on the wire) with ESP in transport mode that is going from A to W. Hence the IP source address is changed. Upon arrival at W, the packet will probably be decrypted successfully since that doesn't depend on IP source address (which was in plaintext—not tunneled). If strictly implemented however, the inbound SPD checking which should follow decrypting will fail, due to the changed IP source address (because it was not the address used to negotiate the security association). So, even the transport mode ESP case fails.

Simply making NAT and IP Sec mutually exclusive is not the solution sought by the art. NAT is being deployed widely because it solves many problems, such as: masks global address changes, lowers address utilization, lowers Internet service provider (ISP) support burden, and allows load sharing as virtual hosts.

Yet, NAT is viewed as the greatest single threat to security integration being deployed in the Internet today. This "NAT problem", as it is invariably termed, is architecturally fundamental. Also, legacy applications and services (for example, those developed for IP version 4) will continue to a long co-existence as applications and services develop for IP version 6. Consequently, there is a great need in the art for providing NAT and IP Sec coexistence, at least in selected situations, and to do so without introducing serious configuration problems. (IP version 4 is described in "Internet Protocol", RFC791, September 1981. IP version 6 is described in Deering, S., Hinden, R., "Internet Protocol, Version 6 (IPv6) Specification", RFC2460, December 1998.)

A VPN connection between two address domains can have the effect of directly connecting two domains which most likely will not have been planned to be connected. Hence increased use of VPNs is likely to increase address conflicts. It is also understood that VPNs redefine network visibility and increase the likelihood of address collision when traversing NATs. Address management in the hidden space behind NATs will become a significant burden. There is, therefore, a need in the art to ameliorate that burden.

In U.S. patent application Ser. No. 09/240,720, a solution to the general problem of integrating IP Sec and NAT is presented. IP security is provided in a virtual private network using network address translation (NAT) by performing one or a combination of the four types of VPN NAT. (The description of three types of VPN NAT from assignee docket END9 1999 0129 US1 is included hereafter, and the fourth is the subject of this application.) This involves dynamically generating NAT rules and associating them with the manual or dynamically generated Internet key exchange (IKE) Security Associations, before beginning IP security that uses the Security Associations. (See, Harkins, D., Carrel, D., "The Internet Key Exchange (IKE)", RFC2409, November 1998. Security Associations is a term defined in RFC201, supra.) Then, as IP Sec is performed on outbound and inbound datagrams, the NAT function is also performed. By "perform IP Sec", is meant to execute the steps that comprise IP Sec outbound or inbound processing, as defined by the three IP Sec RFCs (and others) above. By "perform NAT", is meant to execute the steps that comprise the VPN NAT processing hereafter described in this application.

In U.S. patent application Ser. No. 09/240,720, the customer must configure each separate VPN NAT rule as a separate VPN connection. This is time consuming and prone to error, and VPN connections are really meant to protect the traffic and should be independent of specific VPN NAT rules. That is, the rules have heretofore been one to one— NAT thus increases the number of VPN connections required.

It is an object of the invention to provide an improved and greatly simplified system and method for concurrently implementing both Network Address Translation (NAT) and IP Security (IP Sec).

It is a further object of the invention to provide a system and method for solving the increased likelihood of IP address conflicts inherent in the use of a virtual private network (VPN).

It is a further object of the invention to provide a system and method for enabling utilization of VPNs without requiring re-addressing a domain (an expensive alternative).

It is a further object of the invention to provide a system and method for VPN NAT which can be accomplished entirely in the IP Sec gateway without requiring changes in domain hosts.

It is a further object of the invention to provide a system and method for VPN NAT which requires no, or only minor, changes to routing in each connected domain.

It is a further object of the invention to provide a system and method for VPN NAT which is simple to configure.

It is a further object of the invention to provide a solution to the address collision problems caused by VPNs.

It is a further object of the invention to provide a simplified solution for customer configuration of VPN connections.

It is a further object of the invention to allow a single VPN connection to support multiple VPN NAT rules.

It is a further object of the invention to provide a system and method which, on a system wide basis, avoids conflict among the implicitly, or dynamically assigned, VPN NAT rules.

It is a further object of the invention to provide a system and method which reduces system overhead for dynamic NAT rules by eliminating the need to manage numerous separate VPN connections for each NAT rule.

It is a further object of the invention to provide a VPN NAT system and method which simplifies network monitoring and traffic analysis.

SUMMARY OF THE INVENTION

In accordance with the invention, a system and method are provided for integrating network address translation within a secured virtual private network. An internal network host is configured to send selected traffic to a proxy network address. A virtual private network gateway is configured with a mapping table of network address translation rules. Responsive to the network address translation rules, a virtual private network connection is then started.

Other features and advantages of this invention will become apparent from the following detailed description of the presently preferred embodiment of the invention, taken in conjunction with the accompanying drawings.

BEST MODE FOR CARRYING OUT THE INVENTION

In accordance with the preferred embodiment of the invention, the NAT problem is addressed through functions involving VPN NAT with multiple NAT translation rules applied to a single VPN connection, rather than a single NAT translation rule. This greatly simplifies customer configuration. Previously, each address requiring NAT and VPN had to be configured separately. With reference parent U.S. patent application Ser. No. 09/240,720, additional function is provided for 'type a source-out' and 'type d destination-in' VPN NAT in copending application S/N 09/578 215, assignee docket END9 1999 0129 US1, and in the present application for 'type b destination-out'. To avoid dysfunctional IP Sec connections with the accidental use of HIDE and MAP NAT rules (aka conventional NAT), AH or ESP is checked for during conventional NAT. HIDE and MAP NAT rules are two basic forms of conventional NAT described hereafter in connection with FIGS. 3 and 4. If a given NAT rule would apply to the IP packet, except for the AH or ESP header, address translation is not done. This applies to inbound and outbound NAT. So, the effect is that for conventional NAT (versus VPN NAT for IP Sec, or IP Sec NAT), preference is given to IP Sec. IP Sec overrides conventional NAT.

Since it is not known at the time the NAT rules are loaded whether or not any IP Sec connections might conflict (dynamic IP for example)., checking for such problems cannot be done until actual NAT processing in the operating system kernel. User visibility to these actions is provided, if journaling is on for the rule, by indicating in a journal entry that a NAT rule fits the datagram, but was not done due to IP Sec. In addition, operating system kernel information logging of these actions may be provided for some limited number of occurrences per conventional NAT rule. Similarly, a message per connection, rather than per occurrence, may be provided in a connection manager job log or in a connection journal. "Journaling" and "journal entry" are terms also referring to what is typically known in the art as "logging" and "log entry", respectively.

Pursuant to the invention described in the parent application, referred to as VPN NAT, to allow NAT to be used with IP Sec at the IP Sec gateway, customers retain private internal IP addresses, and increased address collision is avoided by having IP Sec connections begin and end at the IP Sec gateway. An IP Sec gateway is a term defined in RFC2401, supra. The term "VPN connection" is another term referring to what is generally called an "IP Sec tunnel", the latter being defined in RFC2401, supra.

Further in accordance with the parent application, virtual private networks (VPN) are provided in both initiator and responder modes with an integrated NAT function. Security associations are negotiated using the proper external (NAT rhs) IP addresses, and the NATing of corresponding internal (NAT lhs) IP addresses is done by generated NAT rules, in sync with connection load to IPsec and IPSec processing in operating system kernel. Inbound source IP addresses are translated, as well as the usual source IP address NAT on outbound (with corresponding translation of destination IP address on inbound). A 'VPN NAT rule' is represented by blocks 72 and 76 in FIG. 3; that is, the two sets of lhs and rhs addresses comprise a VPN NAT rule.

In accordance with the present invention, a single VPN connection supports multiple VPN NAT rules by allowing the customer to specify a class of NAT rules associated with a VPN connection, and allow the system to dynamically generate a specific NAT binding (rule) out of this class. Further, on a system wide basis, conflict among the implicitly, or dynamically assigned, VPN NAT rules is avoided by associating customer configured NAT address pools with local IP addresses when the VPN NAT type is source inbound. The four types of VPN NAT are defined by Table 1, infra.

Figure 1:
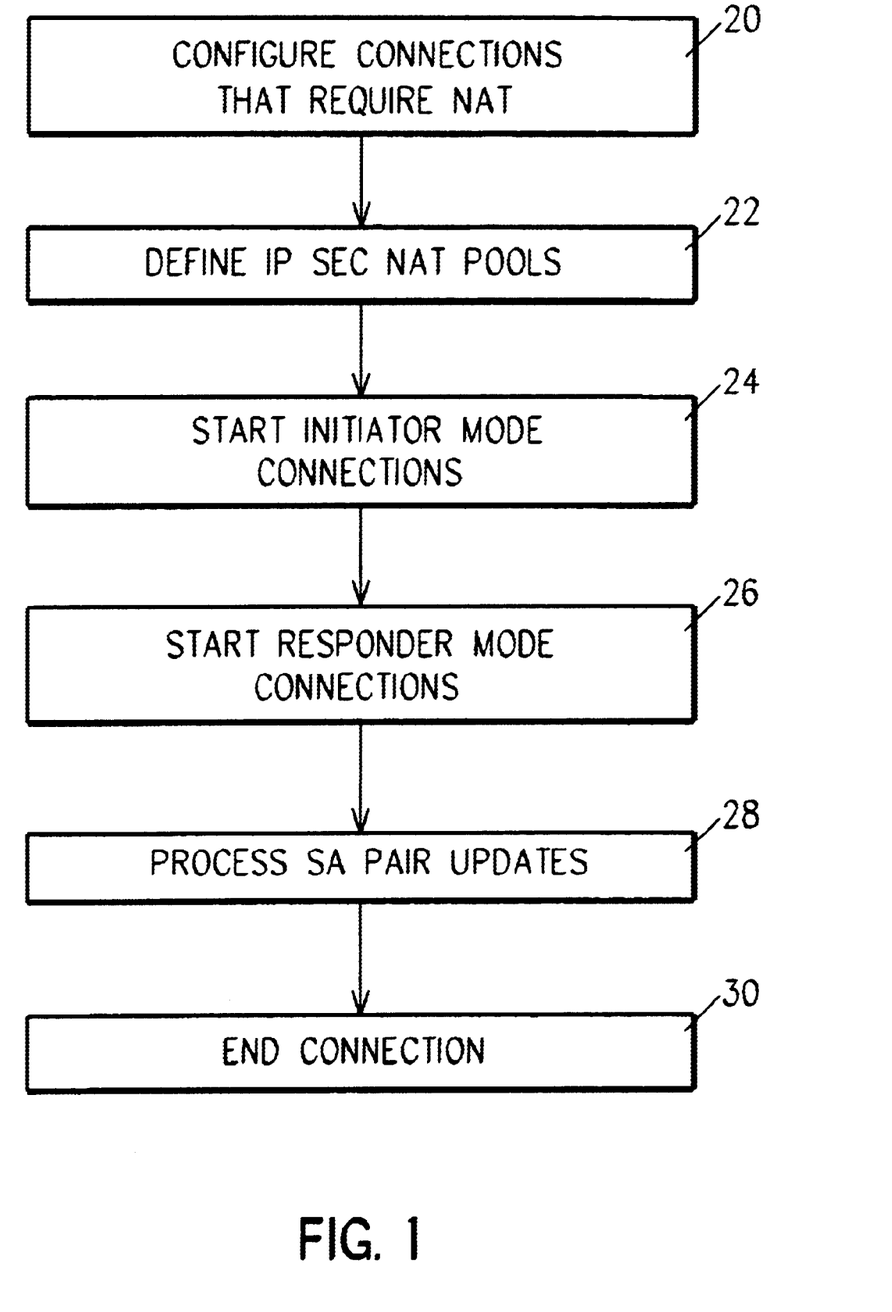
FIG. 1 is a flow diagram of the VPN NAT method of the preferred embodiment of the invention.

Referring to FIG. 1, the method of the preferred embodiment of the invention for executing VPN NAT includes in step 20 configuring connections that require NAT, in step 22 defining IPSec NAT address pools, in step 24 starting initiator mode connections, in step 26 starting responder mode connections (these are started at the other end of the connection), in step 28 processing SA pair updates, and in step 30 ending the connections. (A NAT pool is a set of IP addresses.) Each of these steps is further explained below.

In step 20, the user decides on and configures the connections that will require NAT. This is logically equivalent to writing NAT rules. The four cases to be considered in doing so are depicted in Table 1.

TABLE 1

TYPES OF VPN NAT

| | IDci (source) | IDcr (destination) |
|---|---|---|
| Initiator Mode | source-out type a.NAT internal address, IF src on outbound, IP dest on inbound. | destination-out type b.NAT |
| Responder Mode | source-in type c.NAT external address, IP src on inbound, IP dest on outbound. | destination-in type d.NAT internal address, IF dest on inbound, IP src on outbound. | where
IDci = 'identifier of client initiator',
IDcr = 'identifier of client responder'.

A VPN connection is defined as having four endpoints: two 'connection endpoints', and two 'data endpoints'. (Transport mode then means that the connection endpoint equals the data endpoint, at each end of the connection.) The IDci and IDcr terms refer to the two data endpoints, more specifically, by indicating which is the initiator and which is the responder (see, RFC2409, supra.) Also, these identifiers may take one of about six different forms, which are part of the IDcr, IDcr definitions. For this application, identifier types are not particularly relevant.

When specifying a specific instance of NAT in, for, example, an IP Sec Policy database, the user makes a yes/no decision in, say, a check-box. As used herein, an IP Sec policy refers to the complete set of configured IP Sec information, on a system. This information is stored in what is termed the IP Sec database, or IP Sec policy database. Responder mode NAT flags IDci and IDcr may be part of the connection definition. The initiator mode flag may be part of the user client pair, associated with a 'local client ID' (only). The responder. IDci and IDcr NAT flags can be set independently. Both are relevant only if the connection definition has external initialization mode.

Heretofore, in all cases, if the NAT flag was 'on', the corresponding granularity value was required to be 's' (scalar) in the connection definition. In accordance with the present invention, this is no longer a restriction with dynamic VPN NAT. That is, granularity of 's' (scalar), 'f' (filter) and 'c' (client) are all supported. 'Granularity' is described in RFC2401, supra, at pages 15–16. In accordance with an exemplary embodiment of the invention, for example the IBM AS/400, 'granularity' is implemented as follows: each VPN connection has five selectors (fields in datagram that might be checked to determine if traffic should be in the VPN connection; these are: source IP, dest IP, source port, destination port and protocol. In accordance with this exemplary embodiment, when a VPN connection is started, each selector get its value from either (1) the policy filter for that VPN connection (for selector granularity 'f'), (2) single values from IKE (for selector granularity 's'), or (3) contiguous range of values from IKE (for selector granularity 'c').

Figure 2:
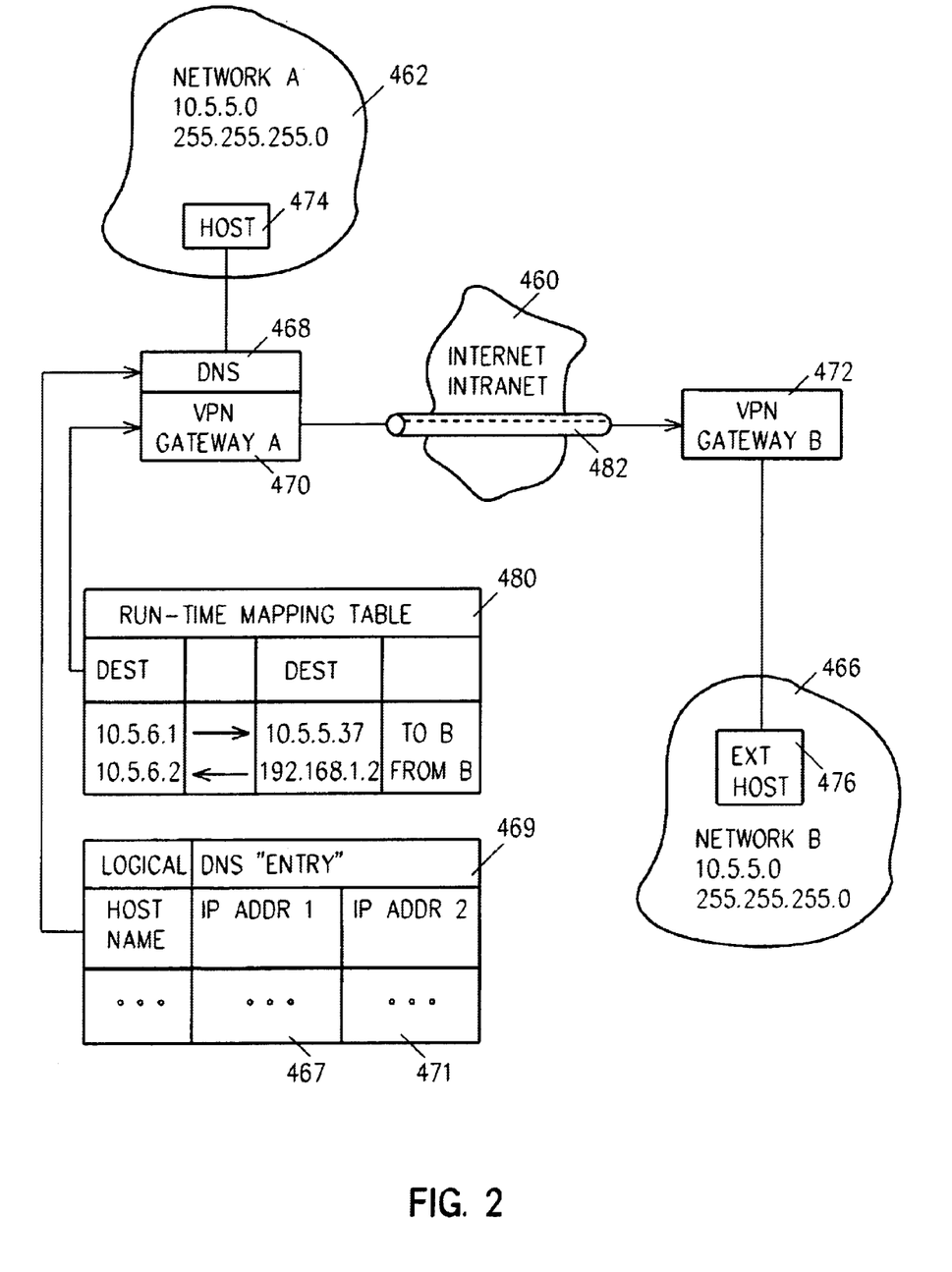
FIG. 2 illustrates destination outbound NAT, used with source outbound NAT, to allow two subnets with identical subnets to communicate in accordance with the preferred embodiment of the invention.

Referring to FIG. 2, the system of an exemplary embodiment of the present invention illustrates a likely customer configuration involving type 'b destination-out'. Networks 462 and 466 are connected by VPN gateway A 470 and VPN gateway B 472 through network 460. VPN gateway A 470 includes, in this embodiment, a domain name server (DNS) 468 and table 480, used by gateway 470 to provide aliases for external address that are the same as those on its own subnet 462. (DNS 468 may be located within gateway 470 or on a host 474 elsewhere within network 462, behind gateway 470 with respect to tunnel 482.) The alias (for example, 10.90.5.37), is translated just before IP sec by gateway 470 into the real address used at the other end of tunnel 482 by gateway 472. The addresses used for destination outbound VPN NAT are obtained in a different manner than for the other three types of VPN Nat. That is, in accordance with the present invention, associated with each remote VPN gateway 472 that a given network 462 needs to communicate with, a customer can configure a destination outbound VPN NAT template or translation rule. For example, the rule depicted in table 480 might be expressed as: 10.5.*.*, meaning all addresses in the indicated subnet are translated. The destination-out NAT rule can specify a single IP address, or multiple IP addresses in various forms, as a range, as a subnet, as a list, or as a combination of these.

Domain name server (DNS) 468 is configured to avoid redundant copies of the information contained (configured) in DNS server 468. This use of DNS also simply solves the problem of how both the host 474 and VPN gateway 470 can share information (by using the existing DNS protocol). DNS server 468 is configured for external host in intranets (such as network B 466) that have or might have conflicting IP addresses with network A 462. Configured in DNS 468 is the logical information in table 469: a host name and two IP addresses. The first IP address 467 is returned by DNS 468 for a normal 'gethostbyname()' query (type A record). The second IP address 471 is returned by another query, perhaps using DNS's text records. (Table 480 in FIG. 2 is logically the same thing as table 410 in FIG. 6.) The relationship between table 469 in FIG. 2 and table 410, 480 is as follows: IP addr1 467 in table 469 collectively form the lhs of table 410, 480, and IP addr2 471 collectively form the rhs of table 410, 480.

Gateway 470 and any hosts 474 behind the gateway all access table 469 via normal DNS queries. Hosts perform a normal A record lookup (for example, by using gethostbyname()) and receive IPaddr1 467. VPN gateway 470 does a query for IPaddr2 471, which, for example, might be in the DNS text record.

To configure DNS server 468, with appropriate information, a user may be presented a graphical user interface in which the logically organized information in table 469 is directly provided by the user. This is then used in the GUI to update the appropriate DNS records. Generally, and entry would be made for each host with these characteristics: it is external to network A 462, it is in an external intranet 466, the addresses in 462 and 466 might conflict, a VPN connection will be utilized between network 462 and 466, there is some business reason for hosts in network 462 to need to communicate with a particular host in network 466. Thus, in accordance with the preferred embodiment of the invention, DNS server 468 is used in a new and advantageous way, but one which is supported by its current functioning. That is, this new use of DNS 468 solves the problem of how table 410, 480 (particularly, the lhs column) is consistent across all the hosts in network 462 and VPN gateway 470. This problem must be solved because each host, say 474, that wishes to communicate with one of the external hosts, say 476, must know that external hosts's lhs address. And the VPN gateway 470 must also know the same lhs address, for a given host 476. DNS 468 is used to solve the problem of distributing common information, without multiple copies and the problems associated with maintaining currency of multiple copies.

The manner in which VPN NAT IP pools relate to network scenarios for the other three types 'a source-out', 'c source-in', and 'd destination-in' is shown in copending patent application S/N 09/578215 filed May 23, 2000 (END9 1999 0129 US1). For type 'b destination-out', the logical equivalent to the NAT pools of the other three types is the set of IPaddr1 467 (the total column in table 469), as configured in table 469, the pool is mapped to rhs's statically. In the other three types, the pool is mapped dynamically, as traffic occurs. To state it another way, the binding time of a lhs with a rhs for type 'b destination-out' is when a pair is configured in DNS, and the binding lasts until reconfigured. The binding time of a lhs with a rhs for the other types of NAT is when traffic occurs that requires NATing, and the binding lasts for the duration of the traffic.

Referring again to FIG. 1, in step 22, the user defines a set of IP addresses that are available for the exclusive use of the VPN NAT function. Each pool is preferably definable as a range of IP address, but could be a list of discontiguous addresses, and is naturally associated with remote ID and local ID IP Sec Policy database entities.

Figure 5:
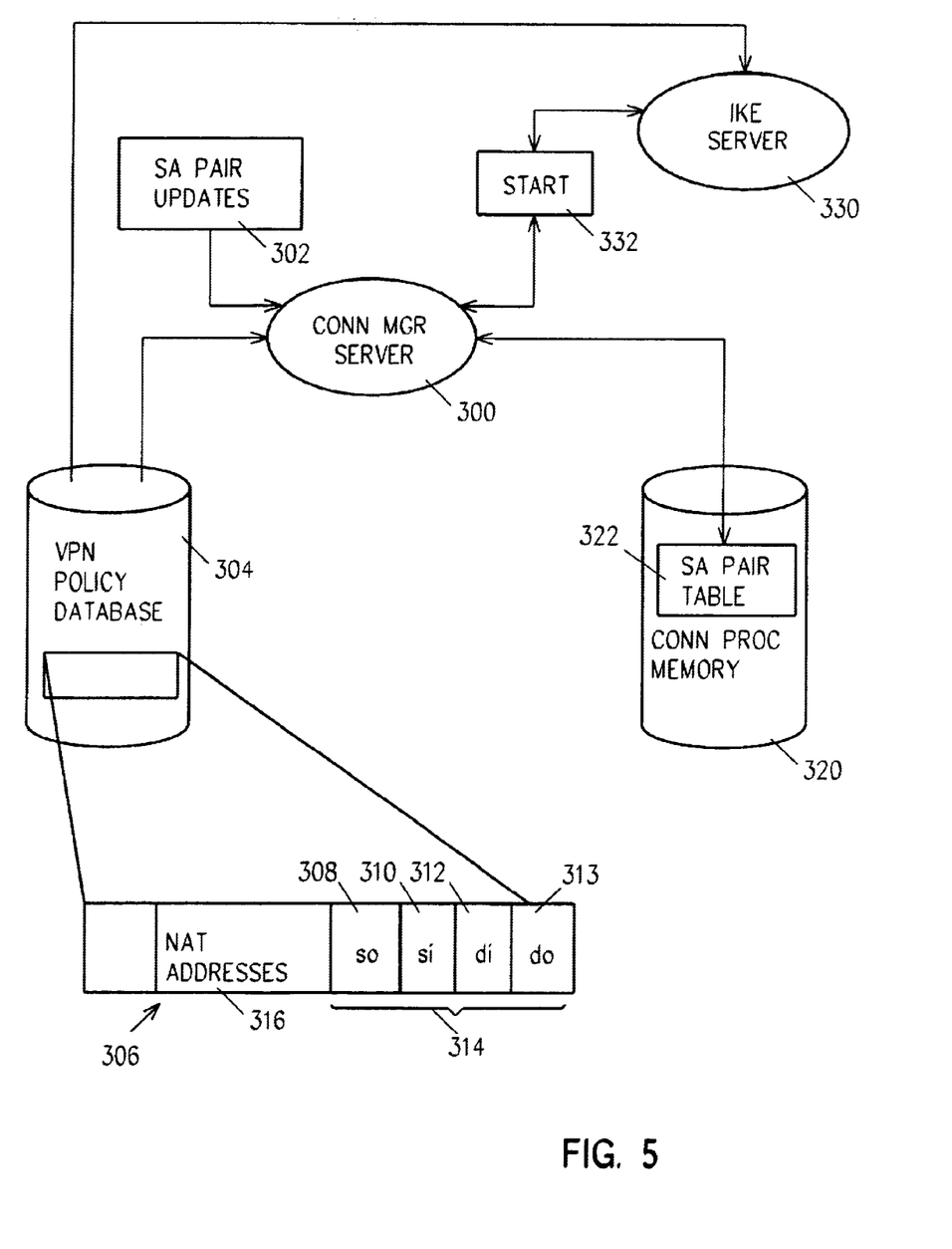
FIG. 5 is a high level flow diagram illustrating the relationships between various program and data elements implementing the system and method of the invention.

Referring again to FIG. 1, in step 24, initiator mode connections are started. As will be more fully described hereafter in connection with FIG. 5, when starting an initiator mode connection, the connection manager 300 (FIG. 5) checks flag do 313 in VPN policy database 304 to determine if the local client ID is to be translated. Referring further to FIG. 5, when destination-out NAT is to be applied to a locally initiated VPN connection, the connection manager 300 generates the runtime mapping table 480 in FIG. 2. This is done as follows: for each IP address defined (as a range, list, subnet, or combination) as a destination address for the VPN connection, connection manager 300 does a DNS lookup (of, for example, the text record) for that destination address, to obtain the rhs address. The destination address corresponds to IPaddr1 467 and the address returned from the DNS query corresponds to IPaddr2 471 in table 469 (FIG. 2). IPaddr2 471 may be a globally routable address or it may be a private (e.g., 10.*.*.*) address. For a locally initiated VPN connection, connection manager 300 then requests that IKE 330 (FIG. 5) negotiate security associations, or SA pairs (SA's) using the rhs address. After IKE completes the SA's, they are passed along to connection manager in start message 332. For a remotely initiated connection, the SA's are passed in the same way.

The NAT rhs IP address is added to the security association (SA) pair, which is completed by the returned SAs from IKE. Connection manager then loads the connection to IPSec. An SA pair is two security associations (defined by RFC2401, supra), one inbound and one outbound.

IPSec generates NAT rules for the two SAs. On outbound, NAT will occur after filtering and before IPSec and on inbound, NAT will occur after IPSec (and before filtering, if any). In this sense, NAT is 'wrapping' the local connection endpoint of the IPSec connection.

Figure 3:
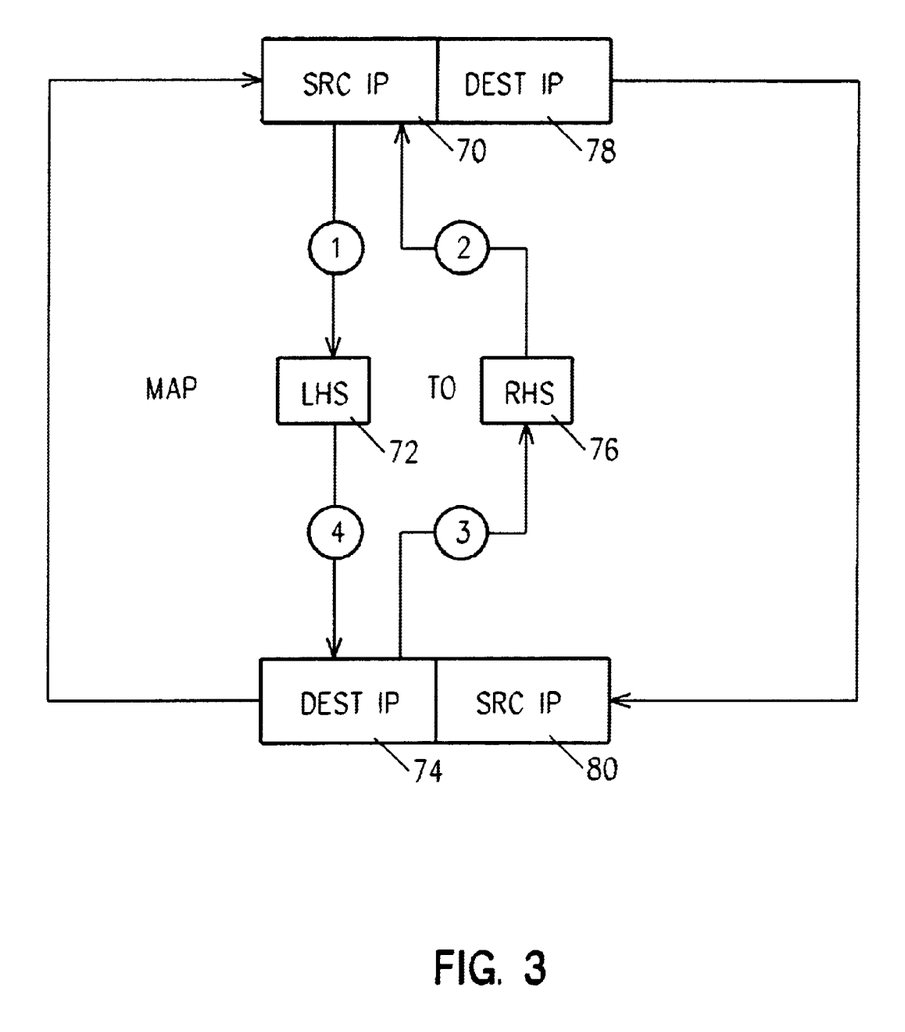
FIG. 3 illustrates static NAT, the simplest conventional NAT, for context.
Figure 4:
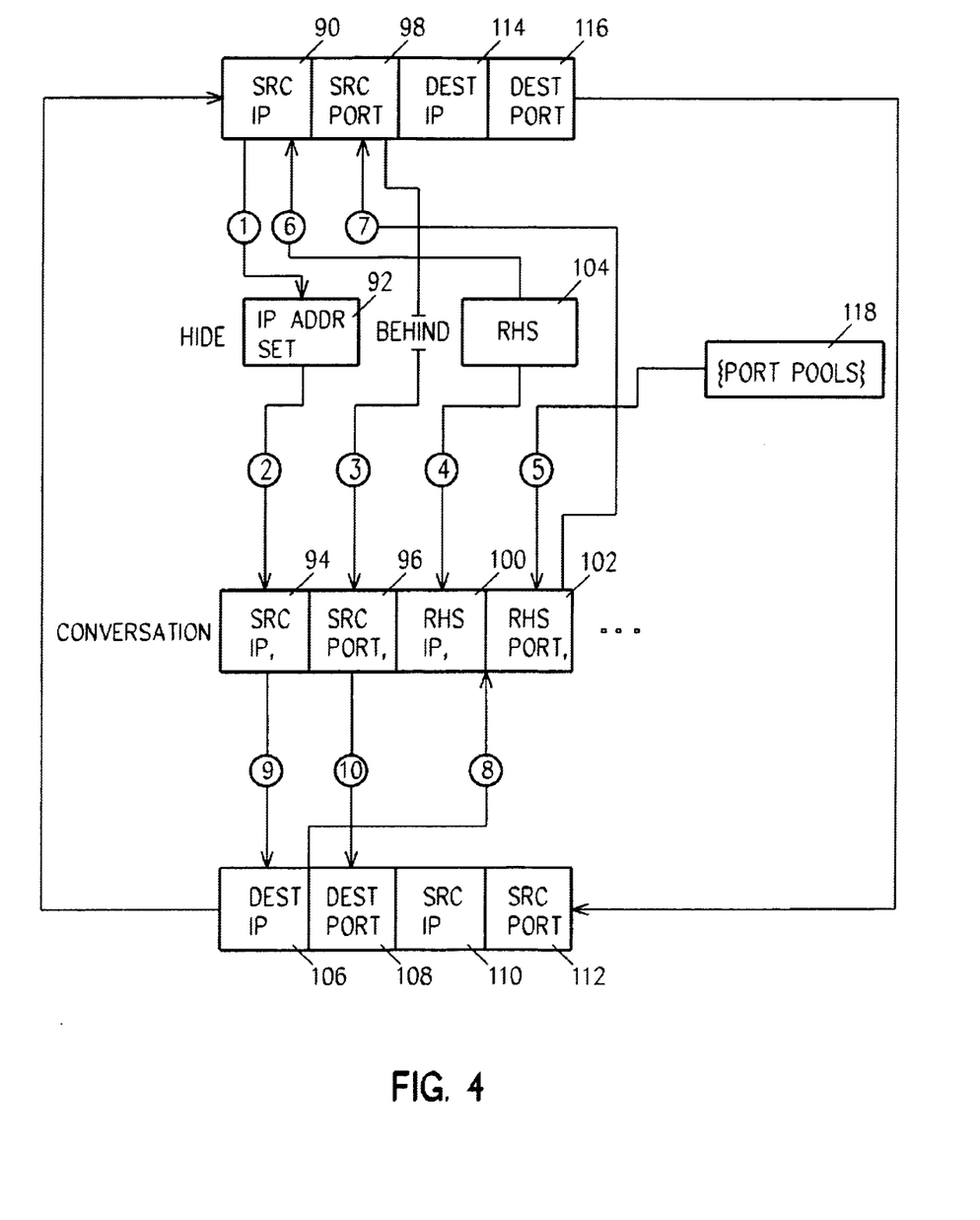
FIG. 4 illustrates masquerade NAT, a type of conventional NAT, for context.

Referring to FIGS. 3 and 4, conventional NAT functions are illustrated for background and contrast with later figures which show VPN NAT types according to the invention.

Referring to FIG. 3, static is the simplest form of NAT. Both conventional NAT types are explicitly configured by the user by writing the corresponding NAT rule statements via the OpNat GUI. This is in contrast to the IPSec NAT, in which the actual NAT rules or statements are generated by the system. The MAP statement <MAP lhs TO rhs> of FIG. 3 and the HIDE statement <HIDE ip addr set BEHIND rhs> of FIG. 4 are such NAT rule statements.

Again referring to FIG. 3, on outbound processing, if in step <1> source ip 70 matches ihs 72 in the MAP lhs TO rhs statement, then in step <2> src ip 70 is translated to rhs 76. On inbound-processing, if in step <3> destination ip 74 matches rhs 76, then in step <4> destination ip 74 is translated to lhs 72. (Steps <1>, <2> . . . refer to the circled numbers 1,2 . . . in the figures.)

Referring to FIG. 4, masquerade NAT (also referred to as network address and port translation (NAPT)), uses the HIDE statement, supra, and provides many-to-one address translation by using its own port pools 118 (UDP, TCP) to remember how to translate the inbound traffic. Unlike static NAT (FIG. 3), masquerade NAT conversations <CONVERSATION src ip, src port, rhs ip, rhs port, . . . > can only be initiated by internal (lhs) addresses. Some types of VPN NAT also employ port mapping, to allow multiple local hosts to concurrently communicate tot he same extgernal system via the same VPN connection.

Referring further to FIG. 4, in processing outbound datagrams, in step <1> if source ip address 90 is determined to be in the ip address set 92 of the HIDE statement, then in step <2> the CONVERSATION is set up by copying src ip 90 into CONVERSATION field 94, in step <3> source port 98 into field 96, in step <4> rhs 104 into field 100, and in step <5> the rhs port into field 102 from the correct pool in port pools 118. Then, in step <6> source ip 90 is translated to rhs 104, and in step <7> source port 98 is changed to rhs port 102. In processing inbound datagrams, if in step <8> destination ip address 106 and destination port 108 match CONVERSATION fields rhs ip 100 and rhs port 102, respectively, then in step <9> destination ip address 106 is translated to CONVERSATION source ip address 94 and in step <10> destination port 108 is translated to CONVERSATION source port 96.

Some special situations are also handled by NAT. These include handling of special situations created by FTP or ICMP, both of which contain IP address that are translated. (FTP refers to File Transfer Protocol, and is defined in RFC959. ICMP refers to Internet Control Message Protocol and is defined in RFC792). Checksum re-calculation is done. In masquerade NAT once a conversation exists, later datagrams are matched against that, rather than the original (precipitating) HIDE rule, the port pools are managed, conversations are timed and terminated, and ports are mapped. It is a particular advantage of the invention that VPN NAT supports ICMP and FTP (including the famous FTP PORT and PASV commands and attendant problems).

In accordance with the present invention, dynamically determined VPN NAT rules are implemented as follows. The customer specifies, via a graphical user interface (GUI) that VPN NATing is to be done. Multiple IP addresses are allowed for the source IP address of locally initiated connections. These multiple IP addresses are specified via range (contiguous) or address and mask, or list of addresses, or a combination of these address representations. These constitute the VPN NAT rule left-hand-side (lhs) address set.

Figure 6:
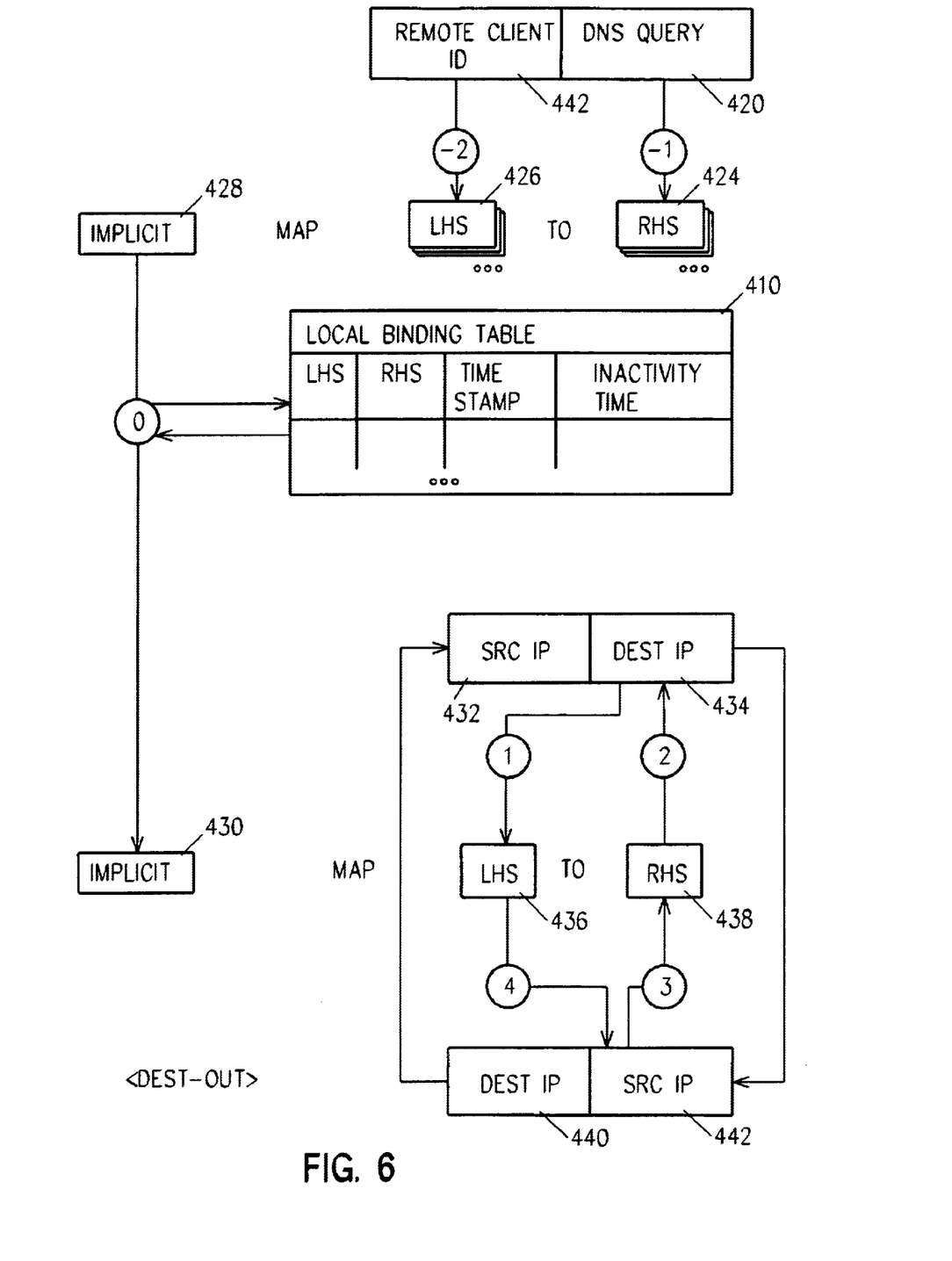
FIG. 6 illustrates VPN NAT, type b (aka 'destination-out'), in accordance with the preferred embodiment of the invention.

Referring to FIG. 6, VPN NAT destination-out is illustrated. For a locally initiated conversation, in step <–2>, since destination-out NAT is requested, implicit MAP rule 428 is created by a series of DNS queries. For each lhs <–2> address, a query is made to retrieve the corresponding rhs <–1> address. There are important attributes that all of these address have in common: (a) they are routable in the VPN gateway's internal network 462 (FIG. 2), to the VPN gateway, and (b) they are not necessary for any other purpose within the internal network. Step <0> is part of starting a VPN connection, and occurs during steps 24 and 26 (FIG. 1). In step <0>, after IKE negotiation is complete using rhs 424, implicit MAP rule 430 is loaded to the operating system kernel. This step <0> comprises the following steps; load the connection SA's and connection filter, and create blank version of table 410. For outbound processing, in step <1> destination IP address 434 of the outbound datagram is compared with lhs entry 436 in local binding table 410. If a match is not found, no destination-out NAT is necessary. If a match is found, in step <2> the datagram destination IP address 434 is replaced by the rhs 438 of the entry (row, pair, rule are equivalent terms) having the matching lhs 436. Outbound NAT processing is complete, and the datagram moves on to the next step in outbound processing, which is IP Sec. For inbound processing, in step <3>, after inbound IP Sec processing, source IP address 442 is compared with rhs entry 438 in local binding table 410. If a match is not found, no NAT is necessary. If a match is found, in step <4> the source IP address 442 is replaced by the lhs 436 of entry having the matching rhs 438. Inbound NAT processing is complete, and the datagram moves to the next step, which is, in general, involves TCP/IP protocol stake processing.

'Inbound' is short for 'inbound datagram'. Datagrams flow out of the VPN gateway (aka outbound traffic) and into the VPN gateway (aka inbound traffic). These two directions, or concepts, are fundamental to almost all communications, if not all instances, including discrete protocol-based communications like TCP/IP, and all functions associated with and, hence, VPN NAT.

The load to IPSec occurs next. When processing remotely initiated connection traffic, two address translations may occur for each inbound and outbound packet (source and destination).

Referring to FIG. 5, connection manager server 300, upon receiving the start message (msg) 332 from IKE server 330, looks at the connection definition 306 in the database 304 and checks the NAT flags 314. The start message 332 from IKE server 330 to connection manager 300 is preceded by a start message 332 from connection manager 300 to IKE 330 for locally initiated connections, and not for remotely initiated messages. In either case, the IKE 330 to connection manager 300 start message 332 is the same message. If one or more NAT remote flags source-out (so) 308, source-in (si) 310, destination-in (di) 312, or destination-out (do) 313 is 'on', then an IP address(es) is obtained from the appropriate NAT pool or from DNS 468 (FIG. 2).

Referring to FIG. 5 in connection with FIG. 1, in step 28, when the connection manager 300 gets SA pair updates 302, it copies the new SA pair information to the SA pair table 322 in connection process memory 320.

In step 30, when ending a connection 34, 36, the connection manager 300 frees (makes available) any NAT IP addresses 52, 54 associated with the connection. NAT IP addresses are removed from the appropriate list 316 maintained by the connection manager 300.

Figure 7:
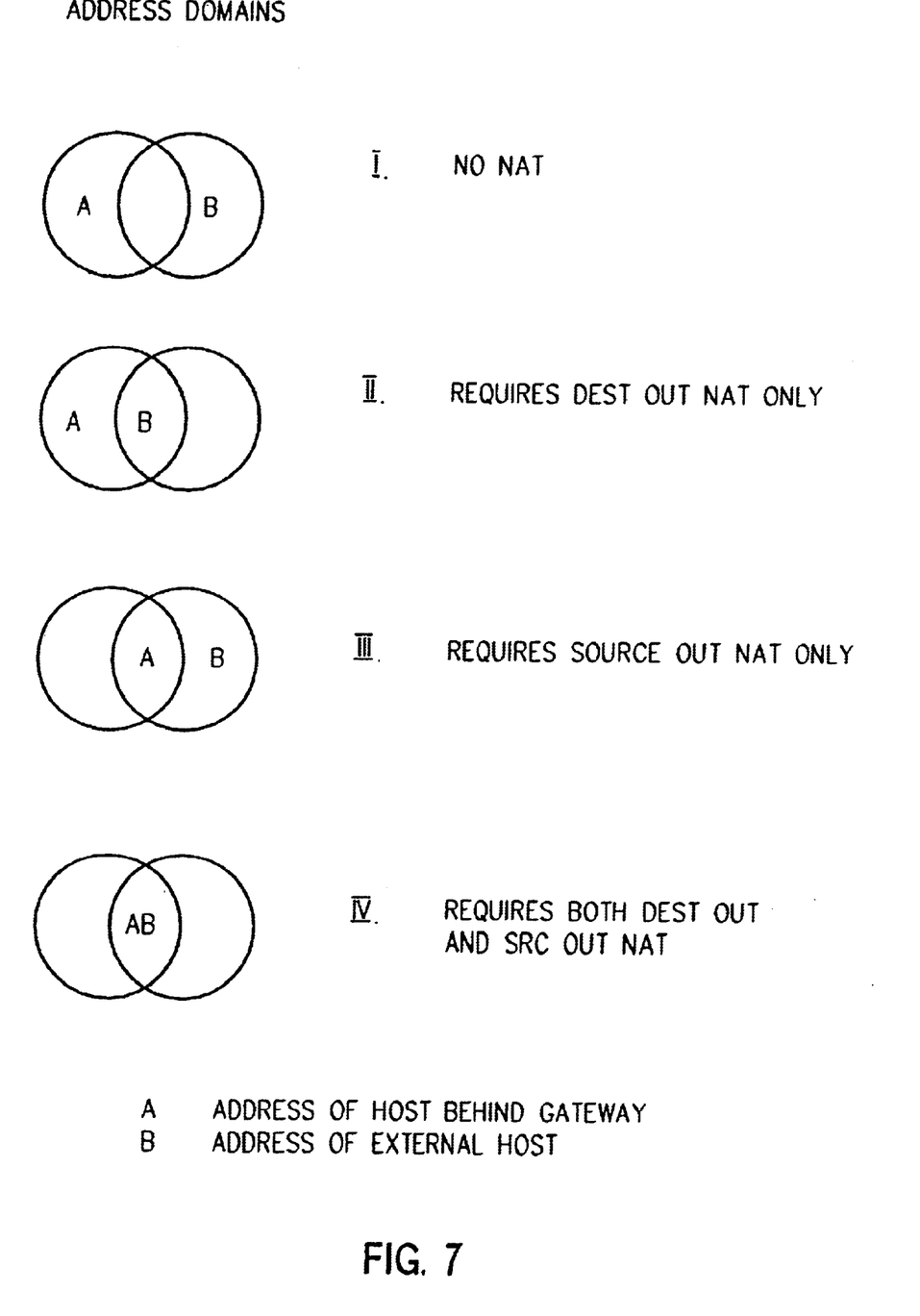
FIG. 7 is a diagram illustrating overlapping address domains and conditions under which destination-out and source-out network address translation is required.

Referring to FIG. 7, the relationship between address domains, host addresses, and whether or not destination out NAT and source out NAT is required is shown. Each circle represents an address domain, A represents the address of a host 474 behind gateway 470, and B represents the address of an external host 476. In case I, neither the address of host A or of host B is within the join of their respective address domains, so no network address translation (NAT) is required. In case II, the address of only remote host B is within the join of the address domains; consequently, destination out NAT is required, and source out NAT is not. In case III, the address of host A is within the join of the address domains, while the address of host B is not; consequently, source out NAT is required, and destination out NAT is not required. In case IV, the addresses of both hosts A and B are within the join of the address domains, and both source out NAT and destination out NAT are required.

Advantages Over the Prior Art

It is an advantage of the invention that there is provided an improved and greatly simplified system and method for concurrently implementing both Network Address Translation (NAT) and IP Security (IP Sec).

It is a further advantage of the invention that there is provided a system and method for solving the increased likelihood of IP address conflicts inherent in the use of a virtual private network (VPN).

It is a further advantage of the invention that there is provided a system and method for enabling utilization of VPNs without requiring re-addressing a domain (an expensive alternative).

It is a further advantage of the invention that there is provided a system and method for VPN NAT which is accomplished entirely in the IP Sec gateway without requiring changes in domain hosts.

It is a further advantage of the invention that there is provided a system and method for VPN NAT which requires no, or only minor, changes to routing in each connected domain.

It is a further advantage of the invention that there is provided a system and method for VPN NAT which is simple to configure.

It is a further advantage of the invention that there is provided a solution to the address collision problems engendered by VPNs.

It is a further advantage of the invention that there is provided a simplified solution for customer configuration of VPN connections.

It is a further advantage of the invention that there is provided a system and method allowing a single VPN connection to support multiple VPN NAT rules.

It is a further advantage of the invention that there is provided a system and method which, on a system wide basis, avoids conflict among the implicitly, or dynamically assigned, VPN NAT rules.

It is a further advantage of the invention that there is provided a system and method which reduces system overhead in systems dynamic NAT rules by eliminating the need to manage numerous separate VPN connections for each NAT rule.

It is a further advantage of the invention that there is provided a VPN NAT system and method which simplifies network monitoring and traffic analysis.

It is a further advantage of the invention that there is provided a VPN NAT system and method which simplifies network monitoring and traffic analysis.

It is a further advantage of the invention that a complete suite of VPN NAT solutions is provided to meet customers' needs.

It is a further advantage of the invention that there is provided a non-redundant method to configure and maintain address associations for certain VPN NAT types.

It is a further advantage of the invention that multiple VPN NAT rules may be specified per VPN connection, for all VPN NAT types.

Alternative Embodiments

It will be appreciated that, although specific embodiments of the invention have been described herein for purposes of illustration, various modifications may be made without departing from the spirit and scope of the invention. In particular, it is within the scope of the invention to provide a computer program product or program element, or a program storage or memory device such as a solid or fluid transmission medium, magnetic or optical wire, tape or disc, or the like, for storing signals readable by a machine, for controlling the operation of a computer according to the method of the invention and/or to structure its components in accordance with the system of the invention.

Further, each step of the method may be executed on any general computer, such as an IBM System 390, AS/400, PC or the like and pursuant to one or more, or a part of one or more, program elements, modules or objects generated from any programming language, such as C++, Java, Pl/1, Fortran or the like. And still further, each said step, or a file or object or the like implementing each said step, may be executed by special purpose hardware or a circuit module designed for that purpose.

Accordingly, the scope of protection of this invention is limited only by the following claims and their equivalents.

We claim:

1. Method for integrating network address translation within secured virtual private network, comprising the steps of:
   configuring an internal network host to send selected traffic to a proxy network address;
   configuring a virtual private network gateway with a mapping table of network address translation rules; and
   responsive to said network address translation rules, starting a virtual private network connection.

2. The method of claim 1, further comprising the step of configuring each said rule to include a destination address and a substitute address.

3. The method of claim 2, further comprising using said virtual private network connection according to the steps of:
   generating a datagram at said internal network host;
   routing said datagram to said gateway;
   at said gateway, routing said datagram through filter rules defining a virtual private network tunnel;
   processing a destination address in said datagram at said virtual private network tunnel responsive to said mapping table according to the steps of:
   searching said table for a match on said destination address with a left address of a left/right address pair;
   upon finding a match, doing address translation by substituting for said destination address the right address of said address pair; and
   performing security processing.

4. The method of claim 3, further comprising the steps of:
   receiving at said gateway an inbound datagram from an external host including a security indicia;
   responsive to said security indicia, determining a network source connection address;
   processing said network connection address according to the steps of:
   searching said table for a match on said source connection address with a right address;
   upon finding a match, doing address translation by substituting for said source connection address the left entry of said address pair; and
   performing security processing.

5. The method of claim 4, said determining step including obtaining from a domain name server behind said gateway a locally routable host alias address for said external host.

6. A method for serving domain names, comprising:
configuring a domain name server behind a gateway to store for external hosts locally routable host alias addresses; building a mapping table by:
presenting to a user a list of host names forming left hand address entries;
responsive to user selection of an entry in said list, prompting said user for entry of a corresponding right hand alias address entry;
iterating said presenting and prompting steps for a plurality of mapping table entries;
responsive to a request from a gateway or from a host behind said gateway for a right hand address, serving said alias address.

7. System for integrating network address translation within a secured virtual private network, comprising:
an internal network host for sending selected traffic to a proxy network address;
a mapping table of network address translation rules; and
a gateway responsive to said network address translation rules for starting a virtual private network connection.

8. The system claim 7, said network address translation rules including a destination address and a substitute address.

9. The system of claim 8, said gateway being operable responsive to a datagram from said host for routing said datagram through filter rules defining a virtual private network tunnel.

10. The system of claim 9, further comprising:
means for processing a destination address in said datagram at said virtual private network tunnel responsive to said mapping table.

11. The system of claim 10, further comprising:
mans for searching said table for a match on said destination address with a left address of a left/right address pair;
means operable upon finding a match for doing address translation by substituting for said destination address the right address of said address pair; and
means for performing security processing.

12. The system of claim 9, further comprising:
receiving including a security indicia;
means responsive to security indicia received at said gateway in an inbound datagram from an external host for determining a network source connection address;
means for processing said network connection address by searching said table for a match on said source connection address with a right address and, upon finding a match, doing address translation by substituting for said source connection address the left entry of said address pair; and
performing security processing.

13. The system of claim 12, further comprising a domain name server behind said gateway for serving locally routable host alias addresses for said external host to both said gateway and to said local host.

14. A system for serving domain names, comprising:
a domain name server behind a gateway for storing locally routable host alias addresses for external hosts;
means for generating a mapping table by presenting to a user a list of host names forming left hand address entries and responsive to user selection of an entry in said list, for iteratively prompting said user for entry of a corresponding right hand alias address entry; and
means responsive to a request from a gateway or from a host behind said gateway for a right hand address for serving said alias address.

15. A process for performing VPN NAT destination-out, comprising the steps of:
building a local binding table of rules including right rule entry and left rule entry pairs;
responsive to a locally initiated conversation requesting network address translation, creating an implicit MAP rule including a left entry and a right entry by copying a local client ID to the left entry and obtaining the right entry from an address pool;
performing security processing with respect to said right entry;
starting a VPN connection including loading a first implicit rule;
for outbound processing, comparing the destination address with said left rule entry in said local binding table, and if a match is found replacing said destination address with said right rule entry; and
for inbound processing, comparing the source address with said right rule entry in said local binding table, and if a match is found replacing said source address with said left rule entry.

16. A program storage device readable by a machine, tangibly embodying a program of instructions executable by a machine to perform method steps for integrating network address translation within secured virtual private network, said method steps comprising:
configuring an internal network host to send selected traffic to a proxy network address;
configuring a virtual private network gateway with a mapping table of network address translation rules; and
responsive to said network address translation rules, starting a virtual private network connection.

17. A program storage device readable by a machine, tangibly embodying a program of instructions, executable by a machine, to perform method steps for serving domain names, said method steps comprising:
configuring a domain name server behind a gateway to store for external hosts locally routable host alias addresses;
building a mapping table by:
presenting to a user a list of host names forming left hand address entries;
responsive to user selection of an entry in said list, prompting said user for entry of a corresponding right hand alias address entry;
iterating said presenting and prompting steps for a plurality of mapping table entries;
responsive to a request from a gateway or from a host behind said gateway for a right hand address, serving said alias address.

18. A program storage device readable by a machine, tangibly embodying a program of instructions executable by a machine to perform method steps for performing VPN NAT destination-out, said method steps comprising
building a local binding table of rules including right rule entry and left rule entry pairs;
responsive to a locally initiated conversation requesting network address translation, creating an implicit MAP rule including a left entry and a right entry by copying a local client ID to the left entry and obtaining the right entry from an address pool;

performing security processing with respect to said right entry;

starting a VPN connection including loading a first implicit rule;

for outbound processing, comparing the destination address with said left rule entry in said local binding table, and if a match is found replacing said destination address with said right rule entry; and for inbound processing, comparing the source address with said right rule entry in said local binding table, and if a match is found replacing said source address with said left rule entry.

19. An article of manufacture comprising:

a computer useable medium having computer readable program code means embodied therein for serving domain names, the computer readable program means in said article of manufacture comprising:

computer readable program code means for causing a computer to effect storing locally routable host alias addresses for external hosts;

computer readable program code means for generating a mapping table by presenting to a user a list of host names forming left hand address entries and responsive to user selection of an entry in said list, for iteratively prompting said user for entry of a corresponding right hand alias address entry; and computer readable program code means responsive to a request from a gateway or from a host behind said gateway for a right hand address for serving said alias address.

* * * * *